US012567326B2

(12) United States Patent
Nishikawa et al.

(10) Patent No.: US 12,567,326 B2
(45) Date of Patent: Mar. 3, 2026

(54) DRIVING EVALUATION DEVICE AND DRIVING EVALUATION METHOD

(71) Applicant: Panasonic Automotive Systems Co., Ltd., Kanagawa (JP)

(72) Inventors: Masakiyo Nishikawa, Nara (JP); Yasushi Kojima, Osaka (JP); Yoshiki Ito, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 88 days.

(21) Appl. No.: 18/606,940

(22) Filed: Mar. 15, 2024

(65) Prior Publication Data

US 2024/0331530 A1 Oct. 3, 2024

(30) Foreign Application Priority Data

Mar. 30, 2023 (JP) ................................ 2023-054681

(51) Int. Cl.

| | |
|---|---|
| ***G08G 1/01*** | (2006.01) |
| ***G07C 5/06*** | (2006.01) |
| ***G08G 1/052*** | (2006.01) |

(52) U.S. Cl.

CPC ............ *G08G 1/0133* (2013.01); *G07C 5/06* (2013.01); *G08G 1/0112* (2013.01); *G08G 1/052* (2013.01)

(58) Field of Classification Search

CPC ........... G08G 1/01; G08G 1/052; G08G 1/16; G08G 1/0112; G08G 1/0133; G07C 5/06; G07C 5/00; B60W 30/00

See application file for complete search history.

(56) References Cited

U.S. PATENT DOCUMENTS

| | | | | |
|---|---|---|---|---|
| 10,239,525 | B2 * | 3/2019 | Arai | G08G 1/01 |
| 2018/0284766 | A1 * | 10/2018 | Minegishi | B60W 50/12 |
| 2019/0077399 | A1 | 3/2019 | Ito et al. | |
| 2020/0160076 | A1 * | 5/2020 | Suzuki | G06V 20/56 |
| 2021/0094575 | A1 * | 4/2021 | Sato | B60W 30/16 |
| 2022/0250615 | A1 | 8/2022 | Tanaka et al. | |

FOREIGN PATENT DOCUMENTS

| | | |
|---|---|---|
| JP | 2012-001185 | 1/2012 |
| JP | 2012-118916 | 6/2012 |
| JP | 2014-078190 | 5/2014 |
| JP | 2015-022124 | 2/2015 |
| JP | 2017-162411 | 9/2017 |
| JP | 2020-086762 | 6/2020 |

(Continued)

OTHER PUBLICATIONS

Notice of Reasons for Refusal for Japanese App. No. 2023-054681, dated Apr. 22, 2025, with English translation.

*Primary Examiner* — Tan Q Nguyen

(74) *Attorney, Agent, or Firm* — Greenblum & Bernstein, P.L.C.

(57) ABSTRACT

A driving evaluation device includes: a lane change detector that detects a start of a lane change by a vehicle; a behavior detector that detects behavior of an other vehicle in a vicinity of the vehicle; and an evaluator that calculates an evaluation value of driving skills of a driver of the vehicle, according to an operating history of the vehicle. The evaluator decreases the evaluation value, when a change in the behavior is detected after the start of the lane change is detected.

11 Claims, 7 Drawing Sheets

(56) References Cited

FOREIGN PATENT DOCUMENTS

| | | |
|---|---|---|
| JP | 2021-005269 | 1/2021 |
| JP | 2021-022258 | 2/2021 |
| JP | 2022-122534 | 8/2022 |
| JP | 2024-005363 | 1/2024 |
| WO | 2022/190918 | 9/2022 |

* cited by examiner

DRIVING EVALUATION DEVICE AND DRIVING EVALUATION METHOD

CROSS REFERENCE TO RELATED APPLICATION

The present application is based on and claims priority of Japanese Patent Application No. 2023-054681 filed on Mar. 30, 2023.

FIELD

The present disclosure relates to a driving evaluation device and a driving evaluation method.

BACKGROUND

Patent Literature (PTL) 1 discloses a device that calculates a risk of collision in the case where, during a lane change by a host vehicle including the device, the host vehicle or another vehicle performs sudden deceleration.

CITATION LIST

Patent Literature

PTL 1: Japanese Unexamined Patent Application Publication No. 2012-118916

SUMMARY

However, the device in PTL 1 can be improved upon.

In view of this, the present disclosure provides a device that is capable of improving upon the above related art.

A driving evaluation device according to an aspect of the present disclosure includes: a processor; and a non-transitory memory in which a program is stored, wherein the processor executes the program to cause the driving evaluation device to operate as: a lane change detector that detects a start of a lane change by a vehicle; a behavior detector that detects behavior of an other vehicle in a vicinity of the vehicle; and an evaluator that calculates an evaluation value of driving skills of a driver of the vehicle, according to an operating history of the vehicle, and the evaluator decreases the evaluation value, when a change in the behavior is detected after the start of the lane change is detected.

A driving evaluation method according to an aspect of the present disclosure is a driving evaluation method executed by a processor by executing a program stored in a non-transitory memory, and includes: detecting a start of a lane change by a vehicle; detecting behavior of an other vehicle in a vicinity of the vehicle; and calculating an evaluation value of driving skills of a driver of the vehicle, according to an operating history of the vehicle, and in the calculating of the evaluation value, the evaluation value is decreased when a change in the behavior is detected after the start of the lane change is detected.

It should be noted that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

A driving evaluation device, and so on, according to an aspect of the present disclosure is capable of improving upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
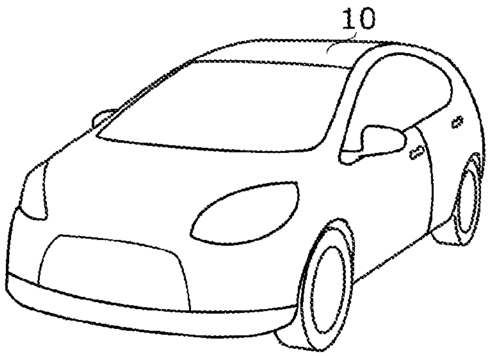
FIG. 1 is a diagram illustrating an external appearance of a vehicle including a driving evaluation device according to an embodiment.

DESCRIPTION OF EMBODIMENTS (Underlying Knowledge Forming Basis of the Present Disclosure)

According to the related art described above, a speed of the host vehicle at which other vehicles can avoid colliding with the host vehicle even if the host vehicle suddenly stops at the maximum deceleration is calculated as the safety speed, and it is determined whether there is another vehicle that collides with the host vehicle when the host vehicle suddenly stops at the maximum deceleration. That is, according to the related art, it is determined whether or not another vehicle collides with the host vehicle, and a case where there is another vehicle traveling at a speed at which the vehicle will not collide with the host vehicle that is close to a speed at which the vehicle will collide with the host vehicle is not considered as a risk. Therefore, there is a possibility that driving skills of the driver during a lane change cannot be correctly evaluated. According to the Heinrich's law, for every serious accident, there are 29 minor accidents and 300 near misses. Therefore, preventing near misses before a serious accident is effective to prevent a collision. In other words, there is a demand for a system that correctly evaluates an occurrence of a near miss.

In view of this, after diligent studies, the inventors have conceived a driving evaluation device, and so on, that is capable of correctly evaluating driving skills of a driver during lane changing.

A driving evaluation device according to a first aspect of the present disclosure includes: a processor; and a non-transitory memory in which a program is stored, wherein the processor executes the program to cause the driving evaluation device to operate as: a lane change detector that detects a start of a lane change by a vehicle; a behavior detector that detects behavior of an other vehicle in a vicinity of the vehicle; and an evaluator that calculates an evaluation value of driving skills of a driver of the vehicle, according to an operating history of the vehicle, and the evaluator decreases the evaluation value, when a change in the behavior is detected after the start of the lane change is detected.

If a change in the behavior of the other vehicle is detected after the start of a lane change by the vehicle is detected, it can be considered that the lane change by the vehicle affected the driving by the driver of the other vehicle. That is, it can be considered that the risk of collision between the vehicle and the other vehicle increased. In this way, the evaluation value of driving skills of the driver is decreased due to the lane change that is a driving action that increases the risk of collision, so that the driving skills of the driver can be evaluated by taking the driving action into account. Therefore, the driving skills of the driver can be correctly evaluated.

A driving evaluation device according to a second aspect of the present disclosure is the driving evaluation device according to the first aspect, wherein the other vehicle is traveling behind the vehicle, in a destination lane of the lane change by the vehicle, and the change in the behavior is deceleration or a change in a steering angle of the other vehicle.

If deceleration or a change in steering angle of another vehicle traveling behind the vehicle in a destination lane of the lane change by the vehicle is detected after the start of the lane change by the vehicle is detected, it can be considered that the lane change by the vehicle affected the driving by the driver of the other vehicle. That is, it can be considered that the risk of collision between the vehicle and the other vehicle increased. In this way, the evaluation value of driving skills of the driver is decreased due to the lane change that is a driving action that increases the risk of collision, so that the driving skills of the driver can be evaluated by taking the driving action into account. Therefore, the driving skills of the driver can be correctly evaluated.

A driving evaluation device according to a third aspect of the present disclosure is the driving evaluation device according to the first aspect or the second aspect, wherein the other vehicle is traveling ahead of the vehicle, in a destination lane of the lane change by the vehicle, and the change in the behavior is acceleration or a change in a steering angle of the other vehicle.

If acceleration or a change in steering angle of another vehicle traveling ahead of the vehicle in a destination lane of the lane change by the vehicle is detected after the start of the lane change by the vehicle is detected, it can be considered that the lane change by the vehicle affected the driving by the driver of the other vehicle. That is, it can be considered that the risk of collision between the vehicle and the other vehicle increased. In this way, the evaluation value of driving skills of the driver is decreased due to the lane change that is a driving action that increases the risk of collision, so that the driving skills of the driver can be evaluated by taking the driving action into account. Therefore, the driving skills of the driver can be correctly evaluated.

A driving evaluation device according to a fourth aspect of the present disclosure is the driving evaluation device according to any one of the first to third aspects, wherein the change in the behavior is emission of a warning sound by the other vehicle.

If emission of a warning sound by the other vehicle is detected after the start of a lane change by the vehicle is detected, it can be considered that the lane change by the vehicle affected the driving by the driver of the other vehicle. That is, it can be considered that the risk of collision between the vehicle and the other vehicle increased. In this way, the evaluation value of driving skills of the driver is decreased due to the lane change that is a driving action that increases the risk of collision, so that the driving skills of the driver can be evaluated by taking the driving action into account. Therefore, the driving skills of the driver can be correctly evaluated.

A driving evaluation device according to a fifth aspect of the present disclosure is the driving evaluation device according any one of the first to fourth aspects, wherein the processor further causes the driving evaluation device to operate as: an environment detector that detects a surrounding environment of the vehicle, and the evaluator further calculates, as the evaluation value, a value that is dependent on the surrounding environment.

Accordingly, since the evaluation value is calculated according to the surrounding environment, the driving skills of the driver can be correctly evaluated.

A driving evaluation device according to a sixth aspect of the present disclosure is the driving evaluation device according to the fifth aspect, wherein the environment detector detects, as the surrounding environment, an environment in which the vehicle has to make a lane change, and the evaluator increases the evaluation value when the environment in which the vehicle has to make a lane change is detected as the surrounding environment when the start of the lane change is detected.

Accordingly, since the evaluation value can be increased (restored to the previous value) when an environment that necessitates a lane change is ascertained, the driving skill of the driver can be correctly evaluated.

A driving evaluation device according to a seventh aspect of the present disclosure is the driving evaluation device according to the fifth aspect, wherein the environment detector detects, as the surrounding environment, a road in which lane changing is prohibited, and the evaluator further decreases the evaluation value when the road in which lane changing is prohibited is detected as the surrounding environment when the start of the lane change is detected.

Accordingly, since the evaluation value is further decreased when an environment in which lane changing is prohibited is ascertained, the driving skill of the driver can be correctly evaluated.

A driving evaluation device according to an eighth aspect of the present disclosure is the driving evaluation device according to any one of the first to seventh aspects, wherein the processor further causes the driving evaluation device to operate as: a presenting unit that presents the evaluation value to the driver.

By notifying the driver of the evaluation value in this way, the driver can recognize that the driver has performed a driving action having a high risk of collision. Thus, the driver can be cautioned to perform a driving action having a low risk of collision.

A driving evaluation device according to a ninth aspect of the present disclosure is the driving evaluation device according to the eighth aspect, wherein when an extent of a decrease in the evaluation value exceeds a threshold value, the presenting unit presents the evaluation value at a time when the evaluation value is calculated, and when the extent of the decrease in the evaluation value is less than or equal to the threshold value, the presenting unit presents the evaluation value at a predetermined timing.

Accordingly, the driver is immediately notified that the driver has performed a driving action having a high risk of collision for which the extent of the decrease in the evaluation value exceeds the threshold, the driver can immediately recognize that the driver has performed a driving action having a high risk of collision. Thus, the driver can be cautioned to perform a driving action having a low risk of collision.

A driving evaluation method according to a tenth aspect of the present disclosure is a driving evaluation method executed by a processor by executing a program stored in a non-transitory memory, and includes: detecting a start of a lane change by a vehicle; detecting behavior of an other vehicle in a vicinity of the vehicle; and calculating an evaluation value of driving skills of a driver of the vehicle, according to an operating history of the vehicle, and in the calculating of the evaluation value, the evaluation value is decreased when a change in the behavior is detected after the start of the lane change is detected.

If a change in the behavior of the other vehicle is detected after the start of a lane change by the vehicle is detected, it can be considered that the lane change by the vehicle affected the driving by the driver of the other vehicle. That is, it can be considered that the risk of collision between the vehicle and the other vehicle increased. In this way, the evaluation value of driving skills of the driver is decreased due to the lane change that is a driving action that increases the risk of collision, so that the driving skills of the driver can be evaluated by taking the driving action into account. Therefore, the driving skills of the driver can be correctly evaluated.

It should be noted that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be described in detail with reference to the Drawings.

It should be noted that each of the embodiments described shows a general or specific example of the present disclosure. The numerical values, shapes, materials, elements, the arrangement and connection of the elements, steps, the processing order of the steps, etc., indicated in the following embodiments are mere examples, and thus are not intended to limit the claims. Furthermore, among the elements described in the following embodiments, elements not recited in any one of the independent claims that indicate the broadest concepts are described as optional elements. Furthermore, the figures are schematic illustrations and are not necessarily accurate depictions. Therefore, the scales, and so on, in the respective figures are not necessarily uniform. Furthermore, elements which are substantially the same have the same reference signs in the figures.

Embodiment

1. Configuration

Figure 2:
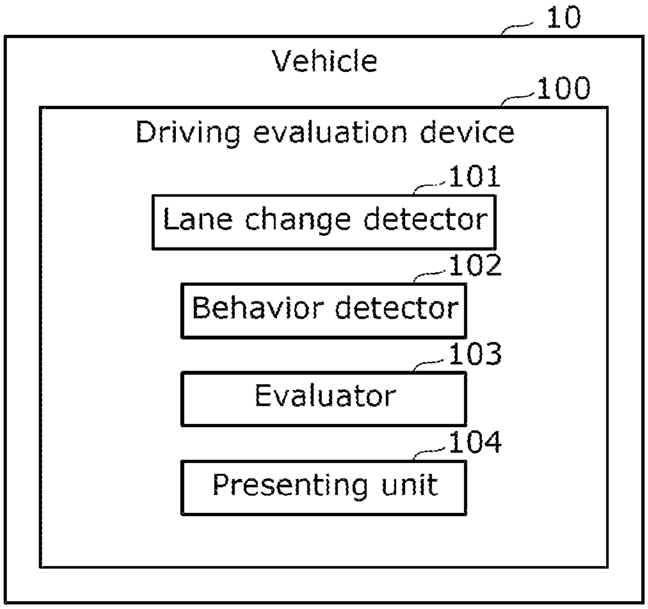
FIG. 2 is a block diagram illustrating a configuration of the driving evaluation device included in the vehicle, according to the embodiment.

FIG. 1 is a diagram illustrating an appearance of a vehicle provided with a driving evaluation device according to an embodiment. FIG. 2 is a block diagram illustrating a configuration of the driving evaluation device provided in the vehicle according to the embodiment.

Driving evaluation device 100 is provided in vehicle 10, and evaluates driving skills of a driver of vehicle 10. Driving evaluation device 100 includes lane change detector 101, behavior detector 102, evaluator 103, and presenting unit 104.

Lane change detector 101 detects a start of a lane change by vehicle 10. More specifically, lane change detector 101 obtains a video from a camera (not shown) provided in vehicle 10, and detects a start of a lane change by vehicle 10 based on the video. The camera is a camera that shoots a video of an area ahead of or behind vehicle 10 in a traveling direction of vehicle 10. For example, based on the video, lane change detector 10 may determine a lane in which vehicle 10 is traveling, and determine that a lane change has started (that is, detect a start of a lane change) when vehicle 10 traverses a line between lanes on the road. Note that the lane change herein means a behavior of vehicle 10 that moves from one of two lanes defined by a line on the road to the other. The two lanes involved in the lane change may be lanes extending in parallel in the traveling direction of the vehicle. Alternatively, one of the two lanes may be a lane that will join to the other a predetermined distance ahead.

Lane change detector 101 may not only determine a start of a lane change based on the video from the camera, but also obtain information about a steering angle of a steering wheel of vehicle 10 from vehicle 10 and determine that a lane change has started (that is, detect a start of a lane change) when the steering angle changes within a predetermined angle range. Furthermore, lane change detector 101 may obtain location information about vehicle 10 and road map information, and determine that a lane change has started (that is, detect a start of a lane change) when vehicle 10 is located on a straight road according to the road map information and the steering angle changes within a predetermined angle range.

Furthermore, lane change detector 101 may obtain operation information about direction indicators of vehicle 10 from vehicle 10, and determine that a lane change has started (that is, detect a start of a lane change) when an operation of a direction indicator is detected according to the operation information. Furthermore, lane change detector 101 may obtain location information about vehicle 10 and road map information, and determine that a lane change has started (that is, detect a start of a lane change) when vehicle 10 is located on a straight road according to the road map information and an operation of a direction indicator is detected according to the operation information.

Behavior detector 102 detects a behavior of another vehicle in the vicinity of vehicle 10. More specifically, behavior detector 102 obtains a video from a camera (not shown) provided in vehicle 10, and detects a behavior of another vehicle in the vicinity of vehicle 10 based on the video. The camera is a camera that shoots a video of surroundings including an area behind vehicle 10 in the traveling direction of vehicle 10. The camera may be the same as or different from the camera used for lane change detector 101 to detect a lane change based on a video. The camera may be a camera that only shoots a video of an area behind vehicle 10 or a camera that shoots a video of surroundings in 360 degrees including an area behind vehicle 10. The camera may be a combination of two or more cameras. Behavior detector 102 may calculate the speed (which may be relative speed or absolute speed) or the steering angle of another vehicle in the vicinity of vehicle 10 based on the video.

Furthermore, behavior detector 102 may obtain an audio signal from a microphone (not shown) that is disposed outside the body of vehicle 10 and collects ambient sounds occurring outside vehicle 10, and determine, based on the audio signal, whether a warning sound is emitted from another vehicle. That is, behavior detector 102 may detect an emission of a warning sound from another vehicle as a behavior of the other vehicle. Note that the warning sound is a sound of a horn of another vehicle, for example.

Evaluator 103 calculates an evaluation value of driving skills of a driver of vehicle 10 according to an operating history of vehicle 10. The operating history of vehicle 10 is an operating history of vehicle 10 by a driver, and includes steering angle of the steering wheel, traveling speed, accelerator position, brake depression amount (braking force) and the like. In calculation of the evaluation value, evaluator 103 may calculate the acceleration of vehicle 10 based on the operating history, and decrease the evaluation value when the acceleration goes out of a predetermined acceleration range. In calculation of the evaluation value, evaluator 103 may decrease the evaluation value when the change of the steering angle of the steering wheel exceeds a predetermined change range according to the operating history.

Furthermore, evaluator 103 decreases the evaluation value of driving skills of the driver of vehicle 10 if behavior detector 102 detects a change in the behavior of another vehicle after lane change detector 101 detects a start of a lane change. Evaluator 103 may calculate a new evaluation value by decreasing an evaluation value calculated according to the operating history, for example. Evaluator 103 may also calculate a new evaluation value by decreasing an evaluation value used as a reference.

Figure 3:
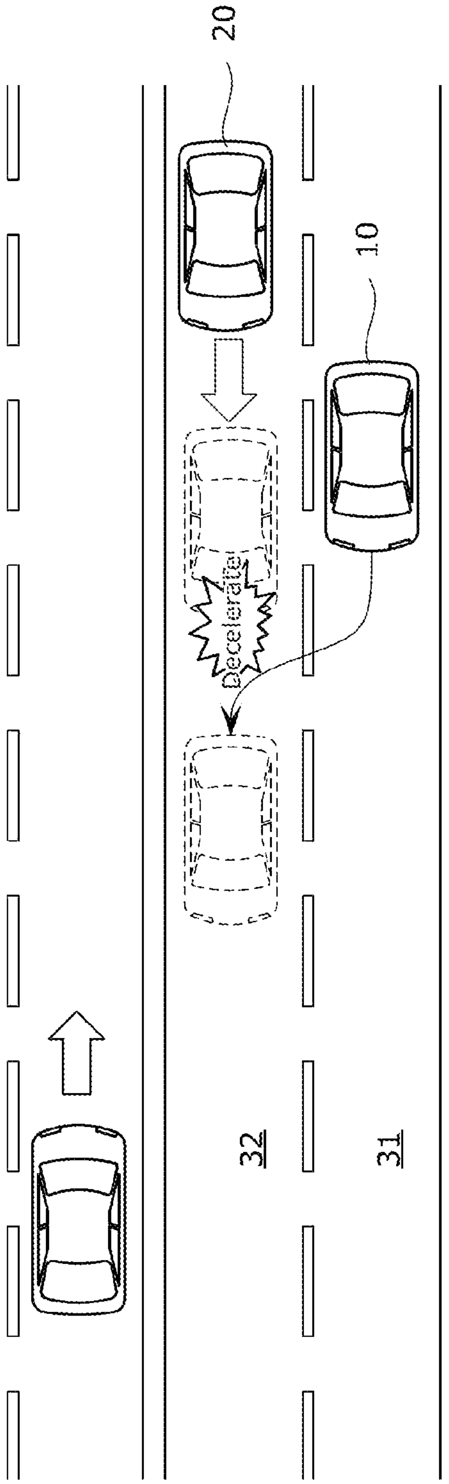
FIG. 3 is a diagram for describing an example of a change in the behavior of another vehicle after a lane change according to the embodiment.

FIG. 3 is a diagram for describing an example of a change in the behavior of another vehicle after a lane change according to the embodiment.

As illustrated in FIG. 3, vehicle 10 is traveling in left lane 31, and other vehicle 20 is traveling in right lane 32. Lane 31 is a lane adjacent to and in the same direction as lane 32. In this drawing, when vehicle 10 moves from lane 31 to lane 32, other vehicle 20 decelerates to prevent collision with vehicle 10.

When other vehicle 20 is traveling behind vehicle 10 in lane 32 that is a destination lane of the lane change by vehicle 10, and other vehicle 20 decelerates when vehicle 10 starts the lane change as illustrated in the drawing, evaluator 103 may decrease the evaluation value of driving skills of the driver of vehicle 10. In this case, the change in the behavior of the other vehicle is deceleration of other vehicle 20. Note that the change in the behavior of another vehicle is not limited to deceleration of other vehicle 20 but may be a change in the steering angle of other vehicle 20. The change in the steering angle is a behavior for preventing collision with vehicle 10, for example, and may be a change enough for a lane change or a change not enough for a lane change.

Presenting unit 104 presents the evaluation value calculated by evaluator 103 to the driver. When the evaluation value falls within a numerical value range of good evaluation, presenting unit 104 may present something for praising the driver or may take no action for praising the driver. When the evaluation value falls within a numerical value range of poor evaluation, presenting unit 104 may present something for cautioning the driver to drive more carefully. Presenting unit 104 may change the manner of presentation according to whether there is a passenger in vehicle 10. For example, when there is a passenger in vehicle 10, presenting unit 104 may present the evaluation value when the passenger is not in the vehicle rather than immediately presenting the evaluation value or transmit the evaluation value to a mobile terminal, such as a smartphone, of the driver for presentation. In this way, when there is a passenger in vehicle 10, presenting unit 104 may present the evaluation value to the driver in such a manner that the passenger does not see the evaluation value of driving skills of the driver.

Furthermore, when similar evaluation values are calculated for a predetermined period (such as 30 minutes or an hour), presenting unit 104 does not have to present each evaluation value. For example, presenting unit 104 may present the evaluation value to the driver when the variation in the evaluation value exceeds a predetermined percentage (such as 10% or 20%).

Note that presenting unit 104 may be implemented by a display provided in vehicle 10 and display the evaluation value, or may be implemented by a speaker provided in vehicle 10 and indicate the evaluation value by a sound. Furthermore, presenting unit 104 may notify a mobile terminal, such as a smartphone, of the driver of information indicating the evaluation value so that the evaluation value is presented on the mobile terminal. In such a case, presenting unit 104 may be implemented by a communication interface that can directly communicate with the mobile terminal or a communication interface that can communicatively connect to a network (such as the Internet) to which the mobile terminal is connected.

2. Operation

Figure 4:
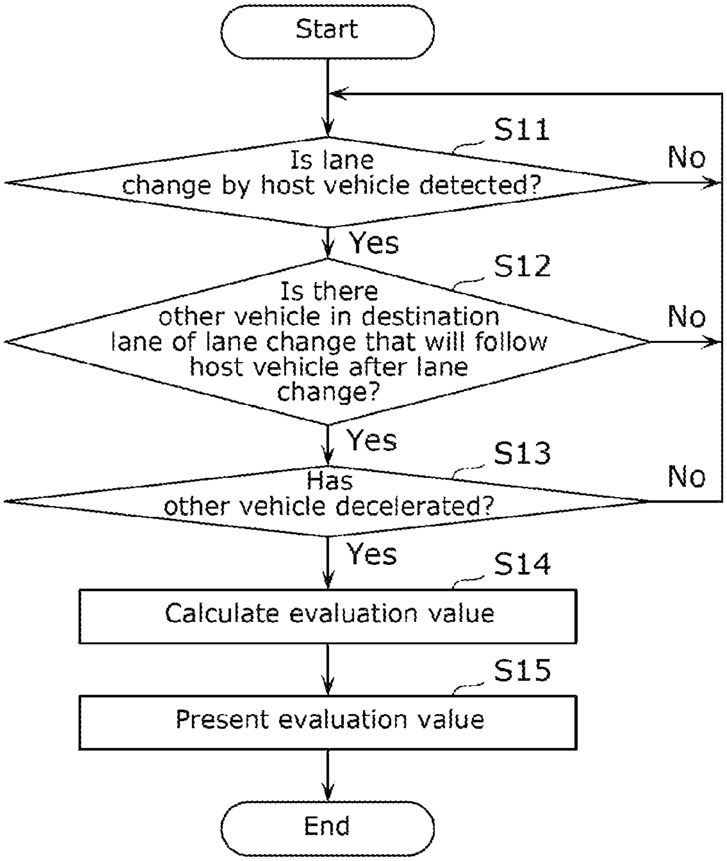
FIG. 4 is a flowchart illustrating an example of an operation of the driving evaluation device according to the embodiment.

FIG. 4 is a flowchart illustrating an example of an operation of the driving evaluation device according to the embodiment.

Driving evaluation device 100 determines whether or not a start of a lane change by a host vehicle (vehicle 10) is detected (S11). The processing of step S11 is processing by lane change detector 101.

When a start of a lane change is detected (Yes in S11), driving evaluation device 100 determines whether or not there is another vehicle (other vehicle 20) in the destination lane of the lane change that will follow the host vehicle after the lane change (S12). The processing of step S12 is processing by behavior detector 102.

When there is another vehicle in the destination lane of the lane change that will follow the host vehicle after the lane change (Yes in S12), driving evaluation device 100 determines whether or not the other vehicle has decelerated (S13). The processing of step S13 is processing by behavior detector 102.

When it is determined that the other vehicle has decelerated (Yes in S13), driving evaluation device 100 calculates the evaluation value (S14). More specifically, driving evaluation device 100 decreases the evaluation value of driving skills of the driver of vehicle 10. The processing of step S14 is processing by evaluator 103.

Note that driving evaluation device 100 returns to step S11 in any one of cases where a start of a lane change is not detected (No in S11), where there is no other vehicle in the destination lane of the lane change that will follow the host vehicle after the lane change (No in S12), and where the other vehicle has not decelerated (No in S13).

After step S14, driving evaluation device 100 presents the calculated evaluation value to the driver (S15). The processing of step S15 is processing by presenting unit 104.

3. Advantageous Effects, Etc.

Driving evaluation device 100 according to the present embodiment includes lane change detector 101, behavior detector 102, and evaluator 103. Lane change detector 101 detects the start of a lane change by vehicle 10. Behavior detector 102 detects the behavior of other vehicle 20 in the vicinity of vehicle 10. Evaluator 103 calculates an evaluation value of driving skills of the driver of vehicle 10 according to an operating history of vehicle 10. Evaluator 103 decreases the evaluation value of the driver driving vehicle 10, when a change in the behavior of other vehicle 20 is detected after the start of the lane change is detected.

If a change in the behavior of other vehicle 20 is detected after the start of a lane change by vehicle 10 is detected, it can be considered that the lane change by vehicle 10 affected the driving by the driver of other vehicle 20. That is, it can be considered that the risk of collision between vehicle 10 and other vehicle 20 increased. In this way, the evaluation value of driving skills of the driver is decreased due to the lane change that is a driving action that increases the risk of collision, so that the driving skills of the driver can be evaluated by taking the driving action into account. Therefore, the driving skills of the driver can be correctly evaluated.

In driving evaluation device 10 according to the present embodiment, other vehicle 20 is traveling behind vehicle 10 in lane 32 that is the destination lane of the lane change by vehicle 10. The change in the behavior of other vehicle 20 is deceleration or a change in the steering angle of other vehicle 20.

If deceleration or a change in the steering angle of other vehicle 20 traveling behind vehicle 10 in lane 32 that is the destination lane of the lane change by vehicle 10 is detected after the start of the lane change by vehicle 10 is detected, it can be considered that the lane change by vehicle 10 affected the driving by the driver of other vehicle 20. That is, it can be considered that the risk of collision between vehicle 10 and other vehicle 20 increased. In this way, the evaluation value of driving skills of the driver is decreased due to the lane change that is a driving action that increases the risk of collision, so that the driving skills of the driver can be evaluated by taking the driving action into account. Therefore, the driving skills of the driver can be correctly evaluated.

Driving evaluation device 100 according to the present embodiment further includes presenting unit 104 that presents the evaluation value to the driver.

By notifying the driver of the evaluation value in this way, the driver can recognize that the driver has performed a driving action having a high risk of collision. Thus, the driver can be cautioned to perform a driving action having a low risk of collision.

4. Variations (1)

In the embodiment described above, an example in which other vehicle 20 travels behind vehicle 10 has been described as illustrated in FIG. 3. However, the present disclosure is not limited to this. Other vehicle 20 may travel ahead of vehicle 10. In such a case, the change in the behavior of other vehicle 20 may be a change in the acceleration or steering angle of other vehicle 20.

The change in the behavior of the other vehicle may be emission of a warning sound by the other vehicle. In such a case, the other vehicle does not have to be a vehicle traveling ahead of or behind vehicle 10 and may be a vehicle traveling on the side of vehicle 10, as far as the other vehicle is traveling in the same direction as vehicle 10.

Figure 5:
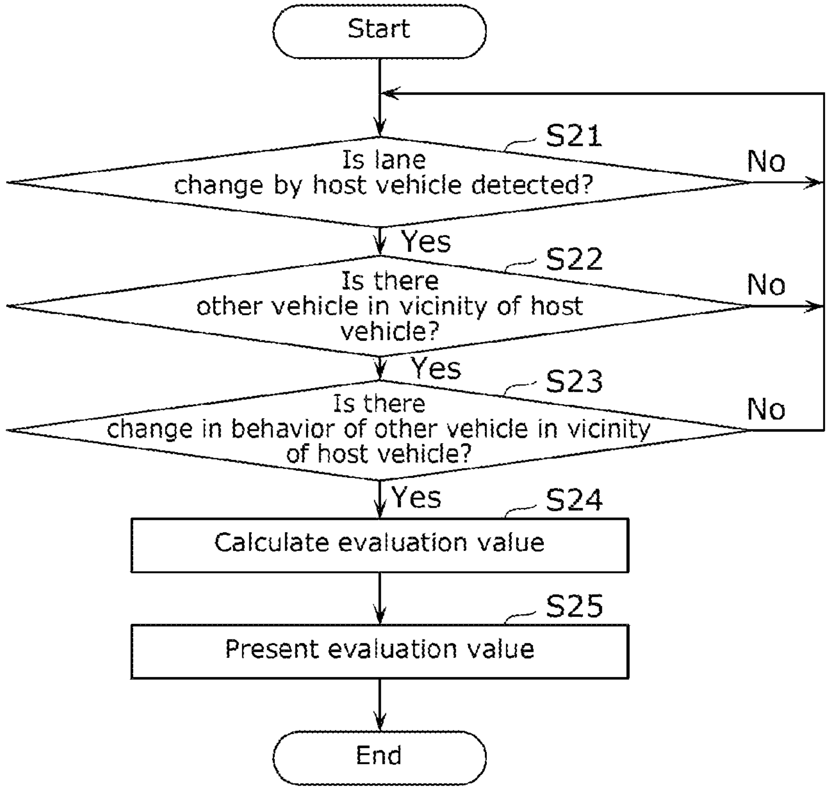
FIG. 5 is a flowchart illustrating an example of an operation of the driving evaluation device according to a variation of the embodiment.

That is, driving evaluation device 100 may perform the operation illustrated in FIG. 5.

FIG. 5 is a flowchart illustrating an example of an operation of the driving evaluation device according to a variation of the embodiment.

Driving evaluation device 100 determines whether or not a start of a lane change by a host vehicle (vehicle 10) is detected (S21). The processing of step S21 is processing by lane change detector 101.

When a start of a lane change is detected (Yes in S21), driving evaluation device 100 determines whether or not there is another vehicle in the vicinity of vehicle 10 (S22). The processing of step S22 is processing by behavior detector 102.

When there is another vehicle in the vicinity of vehicle 10 (Yes in S22), driving evaluation device 100 determines whether or not there is a change in the behavior of the other vehicle in the vicinity of vehicle 10 (S23). The processing of step S23 is processing by behavior detector 102.

When it is determined that there is a change in the behavior of the other vehicle (Yes in S23), driving evaluation device 100 calculates the evaluation value (S24). More specifically, driving evaluation device 100 decreases the evaluation value of driving skills of the driver of vehicle 10. The processing of step S24 is processing by evaluator 103.

Note that driving evaluation device 100 returns to step S21 in any one of cases where a start of a lane change is not detected (No in S21), where there is no other vehicle in the vicinity of vehicle 10 (No in S22), and where there is no change in the behavior of the other vehicle in the vicinity of vehicle 10 (No in S23).

After step S24, driving evaluation device 100 presents the calculated evaluation value to the driver (S25). The processing of step S25 is processing by presenting unit 104.

In driving evaluation device 100 according to a variation (1), the other vehicle is traveling ahead of vehicle 10 in lane 32 that is a destination lane of the lane change by vehicle 10. The change in the behavior of the other vehicle is acceleration or a change in the steering angle of the other vehicle.

If acceleration or a change in steering angle of another vehicle traveling ahead of vehicle 10 in the destination lane of the lane change by vehicle 10 is detected after the start of the lane change by vehicle 10 is detected, it can be considered that the lane change by vehicle 10 affected the driving by the driver of the other vehicle. That is, it can be considered that the risk of collision between the vehicle and the other vehicle increased. In this way, the evaluation value of driving skills of the driver is decreased due to the lane change that is a driving action that increases the risk of collision, so that the driving skills of the driver can be evaluated by taking the driving action into account. Therefore, the driving skills of the driver can be correctly evaluated.

Furthermore, in driving evaluation device 100 according to the variation (1), the change in the behavior of the other vehicle is emission of a warning sound by the other vehicle.

If emission of a warning sound by the other vehicle is detected after the start of the lane change by vehicle 10 is detected, it can be considered that the lane change by vehicle 10 affected the driving by the driver of the other vehicle. That is, it can be considered that the risk of collision between vehicle 10 and the other vehicle increased. In this way, the evaluation value of driving skills of the driver is decreased due to the lane change that is a driving action that increases the risk of collision, so that the driving skills of the driver can be evaluated by taking the driving action into account. Therefore, the driving skills of the driver can be correctly evaluated.

(2)

Figure 6:
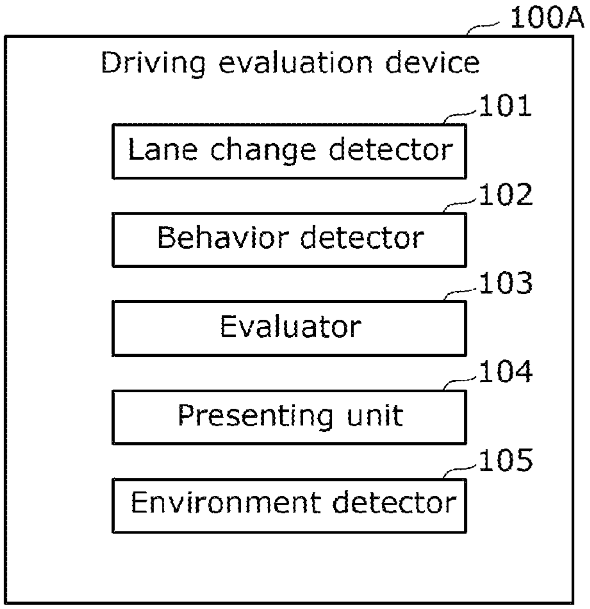
FIG. 6 is a block diagram illustrating a configuration of the driving evaluation device according to a variation (2).

As illustrated in FIG. 6, driving evaluation device 100A according to a variation (2) has basically the same configuration as driving evaluation device 100 according to the embodiment except that environment detector 105 is additionally provided. FIG. 6 is a block diagram illustrating a configuration of the driving evaluation device according to the variation (2).

Environment detector 105 detects a surrounding environment of vehicle 10. More specifically, based on the video from the camera, environment detector 105 detects, as a surrounding environment, that the road on which vehicle 10 is traveling is an environment in which vehicle 10 has to make a lane change. For example, the road that is an environment in which vehicle 10 has to make a lane change is a road that will reduce lanes in a section a predetermined distance ahead. The section with reduced lanes may be a section in which the road narrows down from two lanes to one lane or from three lanes to two lanes. The section with reduced lanes may be a section in which lanes are temporarily reduced under traffic control due to construction or an accident. The road that is an environment in which vehicle 10 has to make a lane change may be a road that will merge to a main lane in a section a predetermined distance ahead of vehicle 10.

Furthermore, environment detector 105 may obtain location information about vehicle 10 and road map information, and determine that vehicle 10 has to make a lane change when a section in which lanes are reduced is a predetermined distance ahead of vehicle 10 according to the road map information.

Furthermore, environment detector 105 may detect a road on which lane changing is prohibited as a surrounding environment based on the video from the camera. Environment detector 105 may obtain location information about vehicle 10 and road map information, and determine a road on which lane changing is prohibited according to the road map information as an environment in which vehicle 10 has to make a lane change.

Evaluator 103 may calculate a value that is dependent on the detected surrounding environment as the evaluation value. For example, evaluator 103 may calculate the evaluation value by correcting the evaluation value calculated in the embodiment or variation (1) according to the surrounding environment, or may calculate the evaluation value based on the results of steps S11 to S31 in the embodiment or the results of steps S21 to S23 in the variation (1) and the detected surrounding environment. According to this, the evaluation value is calculated according to the surrounding environment, so that the driving skills of the driver can be correctly evaluated.

For example, when a start of a lane change is detected, the evaluation value may be increased if an environment in which vehicle 10 has to make a lane change is detected as the surrounding environment. That is, evaluator 103 may restore the original evaluation value, rather than decreasing the evaluation value. In other words, evaluator 103 does not have to decrease the evaluation value even if the conditions of steps S11 to S13 (or steps S21 to S23) for decreasing the evaluation value are satisfied (Yes in steps S11 to S13 or Yes in steps S21 to S23) in the embodiment.

Accordingly, since the evaluation value can be increased (restored to the previous value) when an environment that necessitates a lane change is ascertained, the driving skill of the driver can be correctly evaluated.

Furthermore, for example, evaluator 103 may further decrease the evaluation value when a road in which lane changing is prohibited is detected as the surrounding environment when the start of the lane change is detected.

Accordingly, since the evaluation value is further decreased when an environment in which lane changing is prohibited is ascertained, the driving skill of the driver can be correctly evaluated.

Figure 7:
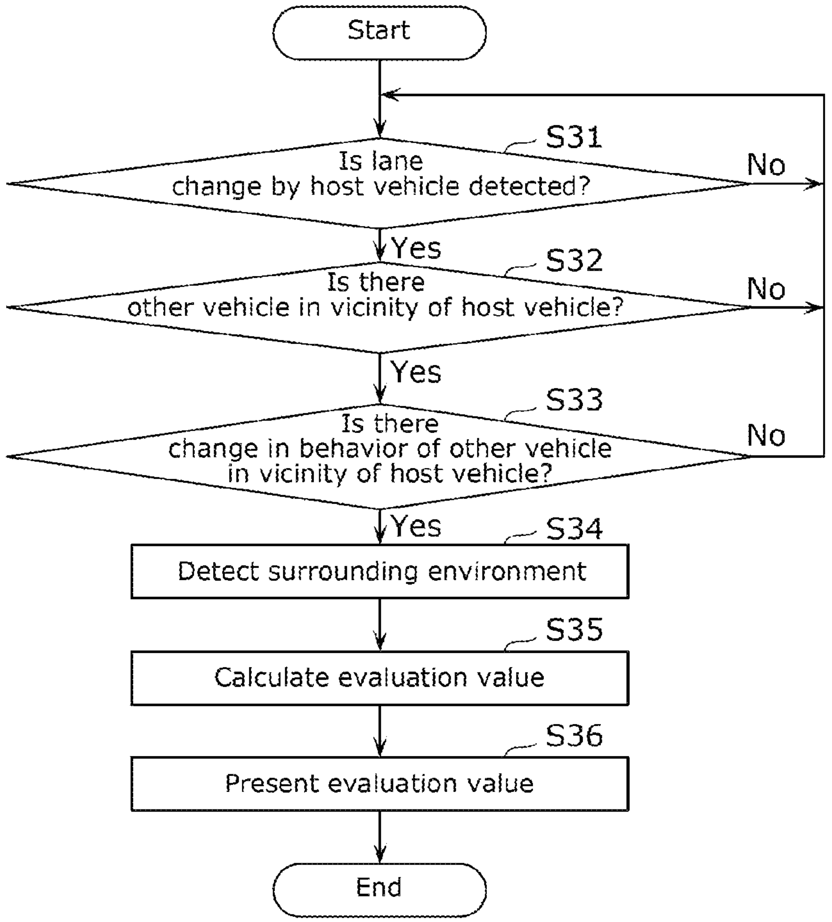
FIG. 7 is a flowchart illustrating an example of an operation of the driving evaluation device according to the variation (2).

FIG. 7 is a flowchart illustrating an example of an operation of the driving evaluation device according to the variation (2).

Driving evaluation device 100A determines whether or not a start of a lane change by a host vehicle (vehicle 10) is detected (S31). The processing of step S31 is processing by lane change detector 101.

When a start of a lane change is detected (Yes in S31), driving evaluation device 100A determines whether or not there is another vehicle in the vicinity of vehicle 10 (S32). The processing of step S32 is processing by behavior detector 102.

When there is another vehicle in the vicinity of vehicle 10 (Yes in S32), driving evaluation device 100A determines whether or not there is a change in the behavior of the other vehicle in the vicinity of vehicle 10 (S33). The processing of step S33 is processing by behavior detector 102.

When it is determined that there is a change in the behavior of the other vehicle (Yes in S33), driving evaluation device 100A detects a surrounding environment of vehicle 10 (S34). The processing of step S34 is processing by environment detector 105.

Note that driving evaluation device 100A returns to step S31 in any one of cases where a start of a lane change is not detected (No in S31), where there is no other vehicle in the vicinity of vehicle 10 (No in S32), and where there is no change in the behavior of the other vehicle in the vicinity of vehicle 10 (No in S33).

Driving evaluation device 100A calculates a value that is dependent on the detected surrounding environment as the evaluation value (S35). The processing of step S35 is processing by evaluator 103.

After step S34, driving evaluation device 100A presents the calculated evaluation value to the driver (S36). The processing of step S36 is processing by presenting unit 104.

(3)

In a variation (3), an example of switching between presentation manners according to conditions will be described. The variation (3) can be implemented by driving evaluation device 100 according to the embodiment.

Figure 8:
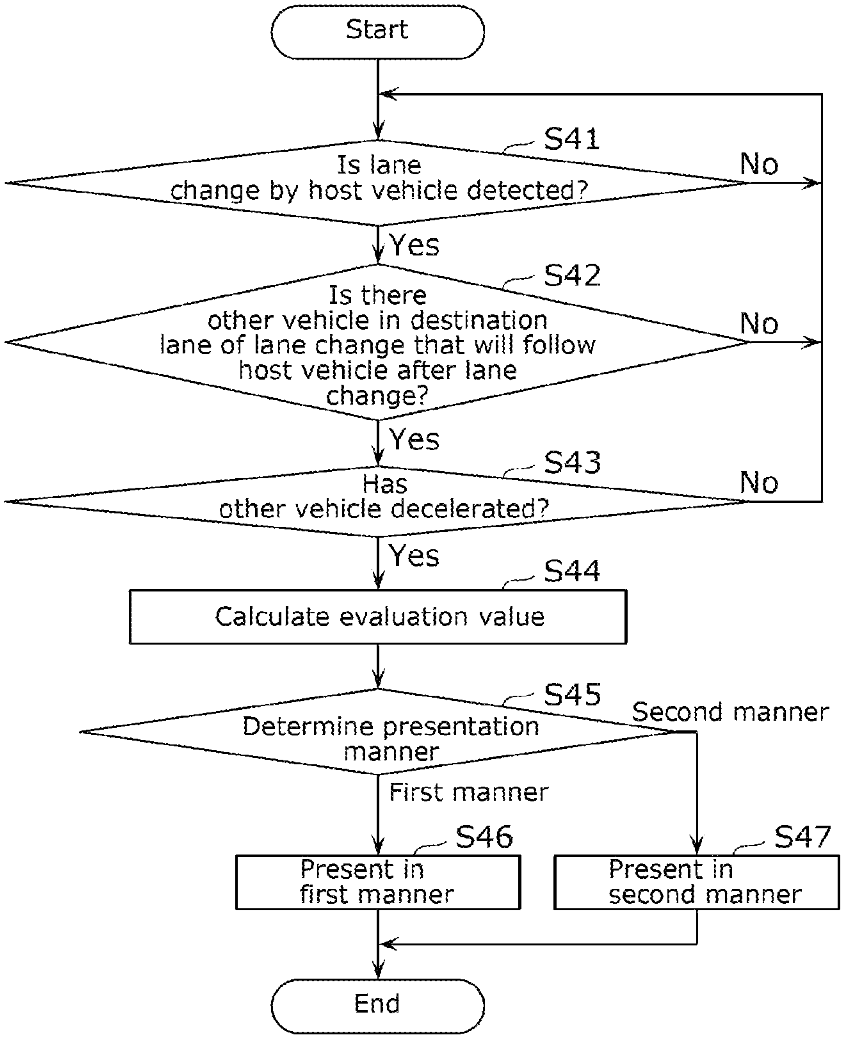
FIG. 8 is a flowchart illustrating an example of an operation of the driving evaluation device according to a variation (3).

FIG. 8 is a flowchart illustrating an example of an operation of the driving evaluation device according to the variation (3).

Driving evaluation device 100 determines whether or not a start of a lane change by a host vehicle (vehicle 10) is detected (S41). The processing of step S41 is processing by lane change detector 101.

When a start of a lane change is detected (Yes in S41), driving evaluation device 100 determines whether or not there is another vehicle (other vehicle 20) in the destination lane of the lane change that will follow the host vehicle after the lane change (S42). The processing of step S42 is processing by behavior detector 102.

When there is another vehicle in the destination lane of the lane change that will follow the host vehicle after the lane change (Yes in S42), driving evaluation device 100 determines whether or not the other vehicle has decelerated (S43). The processing of step S43 is processing by behavior detector 102.

When it is determined that the other vehicle has decelerated (Yes in S43), driving evaluation device 100 calculates the evaluation value (S44). More specifically, driving evaluation device 100 decreases the evaluation value of driving skills of the driver of vehicle 10. The processing of step S44 is processing by evaluator 103.

Note that driving evaluation device 100 returns to step S41 in any one of cases where a start of a lane change is not detected (No in S41), where there is no other vehicle in the destination lane of the lane change that will follow the host vehicle after the lane change (No in S42), and where the other vehicle has not decelerated (No in S43).

After step S44, driving evaluation device 100 determines whether the presentation manner is a first manner or a second manner (S45). More specifically, driving evaluation device 100 determines whether or not the extent of the decrease in the evaluation value exceeds a threshold, and determines that the presentation manner is the first manner when the extent of the decrease in the evaluation value exceeds the threshold and determines that the presentation manner is the second manner when the extent does not exceed the threshold (that is, equal to or less than the threshold).

For example, the extent of the decrease in the evaluation value is the difference between the evaluation value calculated last time and the evaluation value calculated in step S44 or, in particular, the difference in the case where the evaluation value calculated in step S44 is lower than the evaluation value calculated last time. Therefore, the extent of the decrease does not have to be calculated when the evaluation value is equal to or higher than the evaluation value calculated last time. Note that the extent of the decrease in the evaluation value is not limited to the extent of the decrease with respect to the evaluation value calculated last time, but may be an extent of the decrease with respect to a reference value. The extent of the decrease in the evaluation value may be the extent of the decrease in the process of decreasing the evaluation value when the results of steps S41 to S43 are Yes. If the extent of the decrease in the evaluation value exceeds the threshold, it means that the evaluation of the relevant driving action is lower than a prescribed evaluation. That is, it means that the driver has made a driving action evaluated as poor.

When it is determined that the presentation manner is the first manner (First Manner in S45), driving evaluation device 100 presents the evaluation value to the driver in the first manner (S46). More specifically, driving evaluation device 100 presents the evaluation value to the driver when the evaluation value is calculated. That is, in the first manner, the evaluation value is presented when the evaluation value is calculated.

When it is determined that the presentation manner is the second manner (Second Manner in S45), driving evaluation device 100 presents the evaluation value to the driver in the second manner (S47). More specifically, driving evaluation device 100 presents the evaluation value to the driver at a predetermined timing. That is, in the second manner, the evaluation value is presented at a predetermined timing. For example, the predetermined timing may be a regular timing, such as every predetermined time (such as two or five hours or a day), or a timing when it is determined that driving of vehicle 10 by the driver is completed. In the second manner, when there are a plurality of evaluation values calculated, the plurality of evaluation values may be presented at one time. In such a case, the plurality of evaluation values may be presented along with the times when the evaluation values are calculated.

Note that the calculation of the evaluation value may be switched between the point addition system and the point deduction system. Switching between the point addition system and the point deduction system is achieved based on switch information previously stored in a memory. That is, the evaluation value is calculated according to the point addition system when the switch information indicates the point addition system, and the evaluation value is calculated according to the point deduction system when the switch information indicates the point deduction system. Whether the switch information indicates the point addition system or the point deduction system may be set by a user including the driver or may be set by driving evaluation device 100 receiving information from an external device (server) communicatively connected to driving evaluation device 100.

In the point addition system, the evaluation value may not be presented when the extent of the increase in the evaluation value is equal to or less than a threshold (for example, when a point equal to or less than a threshold is added), and the evaluation value may be presented or feedback to the driver may be presented (for example, a message for praising the driver may be presented) when the extent of the increase in the evaluation value exceeds the threshold.

In the point deduction system, the evaluation value may be presented or feedback to the driver may be presented (for example, a message for cautioning the driver to drive more carefully may be presented) when the extent of the decrease in the evaluation value exceeds a threshold (for example, when a point exceeding a threshold is subtracted), and the evaluation value may not be presented when the extent of the decrease in the evaluation value is equal to or less than the threshold.

For example, the point deduction system may be set when driving evaluation device 100 is a device to be sold for a business-to-business (B2B) application, and the point addition system may be set when driving evaluation device 100 is a device to be sold for a business-to-customer (B2C) application. When vehicle 10 is used as both a private car and a taxi, for example, the point addition system may be set when the vehicle is used as a private car, and the point deduction system may be set when the vehicle is used as a taxi. When vehicle 10 is used as both a private car and a company car, for example, the point deduction system may be set when the vehicle is used as a company car, and the point addition system may be set when the vehicle is used as a private car. When vehicle 10 is used by a plurality of drivers, for example, the point deduction system may be set when the vehicle is used by a good driver, and the point addition system may be set when the vehicle is used by a poor driver, such as a beginner driver.

(4)

Although driving evaluation device 100 has been described as being provided with presenting unit 104 in the above embodiment, driving evaluation device 100 does not have to be provided with presenting unit 104. In such a case, driving evaluation device 100 may have a storage that stores the evaluation value calculated by evaluator 103. Driving evaluation device 100 may have an outputter that outputs the evaluation value calculated by evaluator 103. For example, the outputter may output the evaluation value to an information processing device, such as a server communicatively connected to driving evaluation device 100. The information processing device may calculate the insurance fee of a car insurance premium for the driver based on the evaluation value. The insurance premium may be calculated to be lower as the evaluation value is higher (that is, as the driving skills of the driver are better).

(5)

Although driving evaluation device 100 has been described as being provided in vehicle 10 in the above embodiment, driving evaluation device 100 does not have to be provided in vehicle 10, as far as driving evaluation device 100 can obtain information used for detection of a lane change (such as a video from a camera, the steering angle of the steering wheel, and operation information about the direction indicators) and information used for detection of a behavior of another vehicle in the vicinity of vehicle 10 (such as a video from a camera). Driving evaluation device 100 may be implemented by an information processing device, such as a server communicatively connected to vehicle 10.

Although a driving evaluation device according to one or more aspects has been described up to this point based on the foregoing exemplary embodiments, the present disclosure is not limited to the foregoing embodiments. Forms obtained by making various modifications to the forgoing embodiments that can be conceived by those skilled in the art, so long as they do not depart from the essence of the present disclosure, may be included in the scope of the present disclosure.

Furthermore, for example, each of the elements of the respective devices included in driving evaluation devices 100 and 100A are configured using dedicated hardware, but may be implemented by executing a software program suitable for the element. Each of the elements may be implemented by means of a program executer, such as a CPU or a processor, reading and executing the software program recorded on a non-transitory recording medium such as a hard disk or a semiconductor memory.

It should be noted that the present disclosure also includes the cased indicated below.

(1) At least one of the above-described devices may be a computer system configured with, specifically, a microprocessor, a Read Only Memory (ROM), a Random Access Memory (RAM), a hard disk unit, a display unit, a keyboard, a mouse, and so on. The RAM or the hard disk unit stores a computer program. The microprocessor operates according to the computer program, so that the function of the device is achieved. Here, the computer program includes a combination of a plurality of instruction codes indicating instructions to be given to the computer so as to achieve a specific function.

(2) Some or all of the elements included in at least one of the devices described above may be realized as a single system large scale integration (LSI). The system LSI is a super multifunctional LSI manufactured by integrating a plurality of structural components onto a single chip. To be more specific, the system LSI is a computer system configured with a microprocessor, a ROM, and a RAM, for example. The RAM stores a computer program. The microprocessor operates according to the computer program, so that a function of the system LSI is achieved.

(3) Some or all of the elements included in at least one of the devices described above may be implemented as an IC card or a standalone module that can be inserted into and removed from the corresponding device. The IC card or the module is a computer system configured with a microprocessor, a ROM, and a RAM, for example. The IC card or the module may include the aforementioned super multifunctional LSI. The microprocessor operates according to the computer program, so that a function of the IC card or the module is achieved. The IC card or the module may be tamper-resistant.

(4) The present disclosure may be the methods described above. The present disclosure may be a computer program for causing a computer to execute these methods. Moreover, the present disclosure may be a digital signal of the computer program.

Moreover, the present disclosure may be the aforementioned computer program or digital signal recorded on a non-transitory, computer-readable recording medium, such as a flexible disk, a hard disk, a Compact Disc (CD)-ROM, a DVD, a DVD-ROM, a DVD-RAM, a Blu-ray (registered trademark) Disc (BD), or a semiconductor memory. The present disclosure may also be the digital signal recorded on such a recording medium.

Furthermore, the present disclosure may be the aforementioned computer program or digital signal transmitted via a telecommunication line, a wireless or wired communication line, a network represented by the Internet, and data broadcasting.

Furthermore, by transferring the recording medium having the aforementioned program or digital signal recorded thereon or by transferring the aforementioned program or digital signal via the aforementioned network or the like, the present disclosure may be implemented by a different independent computer system.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in its entirety: Japanese Patent Application No. 2023-054681 filed on Mar. 30, 2023.

INDUSTRIAL APPLICABILITY

The present disclosure is useful as a driving evaluation device, or the like, that is capable of correctly evaluating driving skills of a driver during lane changing.

The invention claimed is:

1. A driving evaluation device, comprising:

a processor; and a non-transitory memory in which a program is stored, wherein the processor executes the program to cause the driving evaluation device to operate as:

a lane change detector that detects a start of a lane change by a vehicle;

a behavior detector that detects behavior of an other vehicle in a vicinity of the vehicle;

an evaluator that calculates an evaluation value of driving skills of a driver of the vehicle, according to an operating history of the vehicle; and an environment detector that detects a surrounding environment of the vehicle, the processor, operating as the evaluator, decreases the evaluation value, when a change in the behavior of the other vehicle is detected after the start of the lane change is detected, the processor, operating as the environment detector, detects, as the surrounding environment, an environment in which the vehicle has to make the lane change, and the processor, operating as the evaluator, increases the evaluation value when the environment in which the vehicle has to make the lane change is detected as the surrounding environment, when the change in the behavior of the other vehicle is detected after the start of the lane change.

2. The driving evaluation device according to claim 1, wherein the other vehicle is traveling behind the vehicle, in a destination lane of the lane change by the vehicle, and the change in the behavior is deceleration or a change in a steering angle of the other vehicle.

3. The driving evaluation device according to claim 1, wherein the other vehicle is traveling ahead of the vehicle, in a destination lane of the lane change by the vehicle, and the change in the behavior is acceleration or a change in a steering angle of the other vehicle.

4. The driving evaluation device according to claim 1, wherein the change in the behavior is emission of a warning sound by the other vehicle.

5. The driving evaluation device according to claim 1, wherein the processor, operating as the evaluator, further calculates, as the evaluation value, a value that is dependent on the surrounding environment.

6. The driving evaluation device according to claim 5, wherein the processor, operating as the environment detector, detects, as the surrounding environment, a road in which lane changing is prohibited, and the processor, operating as the evaluator, further decreases the evaluation value when the road in which lane changing is prohibited is detected as the surrounding environment when the start of the lane change is detected.

7. The driving evaluation device according to claim 1, wherein the processor further operates as:

a presenting unit that presents the evaluation value to the driver.

8. The driving evaluation device according to claim 7, wherein when an extent of a decrease in the evaluation value exceeds a threshold value, the processor, operating as the presenting unit, presents the evaluation value at a time when the evaluation value is calculated, and when the extent of the decrease in the evaluation value is less than or equal to the threshold value, the processor, operating as the presenting unit, presents the evaluation value at a predetermined timing.

9. The driving evaluation device according to claim 1, wherein the processor, operating as the evaluator, increases the evaluation value when the environment in which the vehicle has to make the lane change is detected as the surrounding environment, when the change in the behavior of the other vehicle is detected after the start of the lane change, by restoring an original evaluation value, the original evaluation value being the evaluation value before the start of the lane change is detected.

10. A driving evaluation method executed by a processor by executing a program stored in a non-transitory memory, the driving evaluation method comprising:

detecting a start of a lane change by a vehicle;

detecting behavior of an other vehicle in a vicinity of the vehicle;

calculating an evaluation value of driving skills of a driver of the vehicle, according to an operating history of the vehicle; and detecting a surrounding environment of the vehicle, wherein in the calculating of the evaluation value, the evaluation value is decreased when a change in the behavior of the other vehicle is detected after the start of the lane change is detected, in the detecting of the surrounding environment, an environment in which the vehicle has to make the lane change is detected as the surrounding environment, and in the calculating of the evaluation value, when the environment in which the vehicle has to make the lane change is detected as the surrounding environment, the evaluation value is increased when the change in the behavior of the other vehicle is detected after the start of the lane change.

11. The driving evaluation method according to claim 10, wherein in the calculating of the evaluation value, when the environment in which the vehicle has to make the lane change is detected as the surrounding environment, the evaluation value is increased, when the change in the behavior of the other vehicle is detected after the start of the lane change, by restoring an original evaluation value, the original evaluation value being the evaluation value before the start of the lane change is detected.

* * * * *